US007949500B2

(12) United States Patent
Riggle

(10) Patent No.: US 7,949,500 B2
(45) Date of Patent: May 24, 2011

(54) INTEGRATION OF CAUSAL MODELS, BUSINESS PROCESS MODELS AND DIMENSIONAL REPORTS FOR ENHANCING PROBLEM SOLVING

(76) Inventor: Mark Spencer Riggle, Charlottesville, VA (US)

(*) Notice: Subject to any disclaimer, the term of this patent is extended or adjusted under 35 U.S.C. 154(b) by 776 days.

(21) Appl. No.: 11/891,868

(22) Filed: Aug. 14, 2007

(65) Prior Publication Data
US 2007/0294130 A1 Dec. 20, 2007

Related U.S. Application Data

(63) Continuation of application No. 10/842,915, filed on May 11, 2004, now abandoned.

(60) Provisional application No. 60/470,973, filed on May 16, 2003.

(51) Int. Cl.
G06F 17/50 (2006.01)
G06N 7/00 (2006.01)
G06F 3/33 (2006.01)

(52) U.S. Cl. .................... 703/2; 703/6; 706/16; 706/45; 345/440

(58) Field of Classification Search .................. 703/2, 6, 703/22; 714/25, 47; 706/45, 50, 16; 702/181; 345/440
See application file for complete search history.

(56) References Cited

U.S. PATENT DOCUMENTS

| 5,737,727 A | 4/1998 | Lehmann |
| 5,845,272 A | 12/1998 | Morjaria |
| 5,953,707 A | 9/1999 | Huang |
| 6,249,768 B1 | 6/2001 | Tulski |
| 6,442,512 B1 | 8/2002 | Sengupta |
| 6,569,205 B1 | 5/2003 | Poggi |
| 6,681,215 B2 | 1/2004 | Jammu |
| 6,741,980 B1 | 5/2004 | Langseth |
| 6,834,256 B2 | 12/2004 | House |
| 2002/0194039 A1 | 12/2002 | Bhaskaran |
| 2003/0014692 A1 | 1/2003 | James |
| 2003/0191989 A1* | 10/2003 | O'Sullivan ..................... 714/47 |
| 2005/0144151 A1 | 6/2005 | Fischman |

OTHER PUBLICATIONS

Coyle, "System Dynamics Modeling: A Practical Approach", 1996, Chapman & Hall, the Introduction.
OMG, UML specification—www.omg.org/docs/formal/08-03-01.pdf, Aug. 3, 2001, 228-239 Activity Diagrams.
Thomson, "OLAP Solutions", Apr. 15, 2002, the introduction, John Wiley & Sons.
Cognos Incorporated, "Cognos Business Intelligence Products: Enterprise Reporting and Analysis", Jan. 1, 2003, 1 pages, accessed at http://web.archive.org/web/20030210145652/www.cognos.com/products/reporting/index.html.

(Continued)

Primary Examiner — Thai Phan
(74) Attorney, Agent, or Firm — Michael Haynes PLC; Michael N. Haynes

(57) ABSTRACT

This invention combines the modeling capabilities of causal models, business process models, and dimensional reporting to allow the locating of root causes of problems. The causal models let the user explore the effects of other parts of the system have on the process in question through accessing dimensional reports. By recording and annotating the problem solving flow, and deriving characteristics of the problem solved, future users can be assisted in other problem solving sessions. Ad-hoc reports created to aid in the problem solving can be attached in the causal model and process model for future use.

26 Claims, 16 Drawing Sheets

OTHER PUBLICATIONS

Harmon, Paul; Executive Editor, "Business Process Trends Newsletter; The OMG's Model Driven Architecture and BPM", May 1, 2004, 11 pages, Business Process Trends; available for download at http://www.bptrends.com/publicationfiles/05-04%20NL%20MDA%20and%20BPM.pdf.

Object Management Group, Inc., "Common Warehouse Metamodel (CWM) Specification, Version 1.1", 2 Mar. 2003, 576 pp., available at http://www.omg.org/spec/CWM/1.1/PDF/.

Object Management Group, Inc., "OMG Unified Modeling Language Specification, Version 1.5", Mar. 1, 2003, 736 pages, available at http://www.omg.org/spec/UML/1.5/PDF/.

Ventana Systems, Inc., "Vensim Ventana Simulation Environment, User's Guide Version 5", Jan. 1, 2002, 298 pages, Ventana Systems, Inc.

White, "Business Process Modeling Notation (BPMN), Version 1.0", May 3, 2004, 296 pages, BPMI.org.

\* cited by examiner

Figure 4

List of prior explorations

| opened | closed | problem category | characteristics | action | notes | path |
|---|---|---|---|---|---|---|
| 02/10/03 | open | open | 4 drugs large increase broad region coverage no news | none | | <path> |
| 01/01/03 | 01/20/03 | region access | region specific – NE states broad drug coverage - %70 | provided 4 wheel transit for selected areas. | | <path> |
| 11/20/02 | 12/20/02 | medical news - adverse | | started marketing campaign | <notes> | <path> |

Figure 13

*Dimension variables*

Units ordered by region and drug

| Region | Subregion | Asperloft | | Zolergum | |
|---|---|---|---|---|---|
| | | Current | Prior | Current | Prior |
| NE | A | 80 | 100 | 33 | 65 |
| | B | 80 | 75 | 44 | 45 |
| SE | C | 50 | 50 | 39 | 39 |
| | D | 45 | 45 | 45 | 46 |
| | E | 45 | 45 | 22 | 24 |
| NW | A | 45 | 45 | 21 | 15 |

*Measure variable - units shipped*

Figure 15

Report Contexts

Context 1

Region - NE
         NW
Drug - Asperloft

Context 2

Region - ALL
Drug - Asperloft
Time - current month
       prior month

INTEGRATION OF CAUSAL MODELS, BUSINESS PROCESS MODELS AND DIMENSIONAL REPORTS FOR ENHANCING PROBLEM SOLVING

CROSS-REFERENCE TO RELATED APPLICATIONS

This application is a continuation of, claims priority to, and incorporates herein by reference in its entirety, pending U.S. patent application Ser. No. 10/842,915, filed 11 May 2004, now abandoned which claims priority to U.S. Provisional Patent Application 60/470,973 filed on 16 May 2003 titled "Integration of Causal Models, Business Process Models and OLAP Reports for Enhancing Problem Solving".

STATEMENT REGARDING FEDERALLY SPONSORED RESEARCH OR DEVELOPMENT

Not Applicable

BACKGROUND OF THE INVENTION

1. Field of the Invention

This invention relates to the field of computing and methods to model business.

2. Background

Large business enterprises have many complex and interrelated business processes. Changes in one process many have many other unintended effects on other processes. Business analysts often have to figure out or problem solve on these processes when something is detected to have gone wrong or to improve and change the business. These analysts use many reports to understand how the business is functioning and often will create many other ad-hoc reports to determine exactly how to respond to problems or how to change the business. A large business many have many thousands of standard reports and have many thousands more of ad-hoc created reports. Few of those ad-hoc reports are ever used again because the context and reason for the report are not understood by anyone else and thus cannot be located. This leads to the same or very similar ad-hoc reports being created many times.

Few people in a single business understand more than a dozen or so reports and this makes it very difficult to determine what is actually causing problems in the business. Finding the root causes of the problem may be difficult and often there are only a few people who understand enough about how the business operates, how and where to find the data to explore, and can apply enough knowledge to correct the problem. These people have knowledge that is very important to the business and this invention helps capture that knowledge and let others utilize it by visually showing the relationships of business processes, the relevant measures of those processes, and cause and effect chains.

This invention uses causal models, business process models, and dimensional report concepts to capture the knowledge that experienced business analysts have when they problem solve on a business. FIG. 14 shows the process that business analysts use to do that problem solving. This invention directly aids in three of the boxes depicted in the problem solving flow; 1) determine root causes, 2) determine possible actions, and 3) monitor results and effects.

A causal model shows variables and factors and the influence they have on others. For example, the costs of health care is influenced by the number of people who smoke. Changes in the number of people who smoke will change the costs of future health care, thus the 2 variables are linked by a causal arc. See FIG. 1 for an example of how more complex models can be visually represented. The causal links may have the direction of the effect shown on the link, for example, an increase in the number of smokers gives an increase in the health costs. This could be shown by using a plus sign icon. The reverse relationship could be shown using a minus sign icon. The link may have other properties that may be qualitative or quantitative, for example, an expected time delay. The time between an increase in smokers and an increase in costs could be several years. This can be shown by using a italic letter D icon.

Causal models have various other names and uses and somewhat different formalisms to support a particular use. They are very similar to Influence Diagrams, Causal Loops, and System Dynamics. See Coyle.

Business process models generally fall into activity/process models or Petri-net models which are equivalent but are often notated differently. The process model is the more commonly encountered type and most available tools for process modeling handle that type. They can be referred to as activity models or business process models or workflow models. We will refer to them as activity models. The activity models show the sequence of actions needed for a process along with the resources consumed, used and created along with major decision points. An example visual representation of a process model is shown in FIG. 16. Process models can be modeled as a type of activity diagram in UML. See OMG UML specification.

Dimensional reports are reports that show metrics broken down by dimension elements. An example report is shown in FIG. 13. See Thompsen, OLAP Solutions. Metrics, or measures, are the numbers in the cells of the report, for example the number of smokers or the sales of a particular product or product family. The dimensions are the ways the measures are broken out. Each dimension has elements that partition that dimension. For example, a geographic dimension is partitioned by US states as elements. Furthermore, that dimension may have a hierarchy of element partitions. That geographic dimension may have regions which consist of multiple states. The report can then for example give totals for each state and also for each region. Most reports are dimensional in nature, however, they do not have to show more than one level of a dimension. The power of a dimensional report comes from having hierarchies that can be used to examine how different elements and levels affect the measures. A single report can show multiple different measures on the common dimensions, for example, both health care costs and number of smokers can be on a single report and be broken down by region and state.

This invention combines each of the models in a novel way to allow navigation between the causal models, the process models and the reports while incorporating knowledge of prior problem solving experience.

Problems in a business may be indicated by reports that show measures deviating from a desired value or expected behavior. These measures are the metrics of activities or processes of the business and the measures can be directly related to the business process models for the activity or process they correspond to. The business process model can show how those measures are related to other measures in the system. Most often, the measure that is used to alert to business analyst is not directly changeable. For example, a report showing sales have dropped does give the reason why and what should be done. Understanding the root causes of a problem requires a theory of cause and effect. To take action to address that problem also requires a theory of cause and effect that must take into account that the action may directly affect the root cause of the problem or just compensate for it.

The causal models captures a portion of that cause and effect theory. They show those measures and other measures and factors that are important in understanding the mechanism of the effect. Some factors in the model may not correspond to variables that are not directly measurable and thus not in a report, but are still very useful in understanding why the effect connection is true. The causal model can also indicate what variables and factors are controllable by the business, for example adjusting the price. These are called levers. The variables on the causal model can be directly linked to and thus navigable to reports that give information on that variable and the current environment. In addition, unstructured knowledge, such as Word documents or PDF files or GOOGLE searches can be linked to the variables in the causal model. Those variables can also be directly connected and link to the business process models if they are measures of a modeled process. The can link to the actual activity metric on the model. If the causal model has accurate information on quantitative effects of the causal links, the model can be quantitatively simulated to check for effect ranges as in standard Systems Dynamics analysis.

The creation of causal models is difficult and complex because they are usually derived from experience. Business analysts take a long time to understand the dynamics of a business and how to gather the information needed to gain the correct insight. It is that experience that is so important to capture. The building and maintaining of the causal models is an on-going endeavor where new factors are discovered and new hypotheses are created in a continuous process. By capturing the knowledge in a formal interrelated model, the knowledge can be shared and reused by other people.

PRIOR ART

Causal models are used to simulate systems, an example is Vensim (www.vensim.com). This simulation uses the dynamics of feedback loops to determine behavior, much as in solving differential equations via numerical methods. The can also be used in supplying advice in problem solving or even in integrating an expert system to aid in the problem solving as in U.S. Pat. No. 5,845,272.

Business process modeling technology is wide spread and has many variations on presentation, for example the models for the OMG UML or from the www.bpmi.org have variation, but are fundamentally similar. Often these models can be simulated using discrete event simulation which can show capacities of various processes. However, we are not concerned with the simulation capability of either model formalism.

Dimensional reports are also well known technology and many software vendors have off the shelf software to create these reports, such as Microstrategy (www.microstrategy.com) and Cognos (www.cognos.com). A model standard for these type reports is given by the OMG (www.omg.org) in the CWM specification (Common Warehouse Metamodel). This standard is merely for a sample representation of the dimensional structure since there are many ways of representing that.

The combination of the 3 technologies to create a method of navigating sets of reports and understanding how to solve problems in a business is novel to this invention.

BRIEF SUMMARY OF THE INVENTION

This invention integrates the modeling capabilities of causal models, business process models, and dimensional reporting to allow locating of root causes of problems and the capturing of that problem solving knowledge. The modeling and navigation among the models allows the understanding of the relationships among business variables. Using each model and report in a coordinated way, the models let the user explore how other parts of the system effect the process in question. Inexperienced business analysts can then use the models and get information on how the models were used in the past to solve similar problems or other related problems. By being able to see how others have determined root causes and formulated fixes, the inexperienced user gains the knowledge of the other more experienced users.

The way analysts navigate the models is recorded and can be annotated and classified for use by others. In addition, problems can have characteristics associated with them that also provide help in determining root causes. In addition the models allow determining other changes that may occur from proposed actions and post information for the users impacted by those changes. That is, future reports may indicate changes that are really caused by actions taken here. Those changes can be indicated.

This invention allows the users to navigate complex information. It allows a method to record and place additional information about reports, processes and cause and effect chains.

BRIEF DESCRIPTION OF THE DRAWINGS

FIG. 4 is an example of a window showing parts of prior problem solving cases.

FIG. 13 is an example of a dimensional report.

FIG. 15 is an example of a dimensional report context.

DETAILED DESCRIPTION OF THE INVENTION

Figure 1:
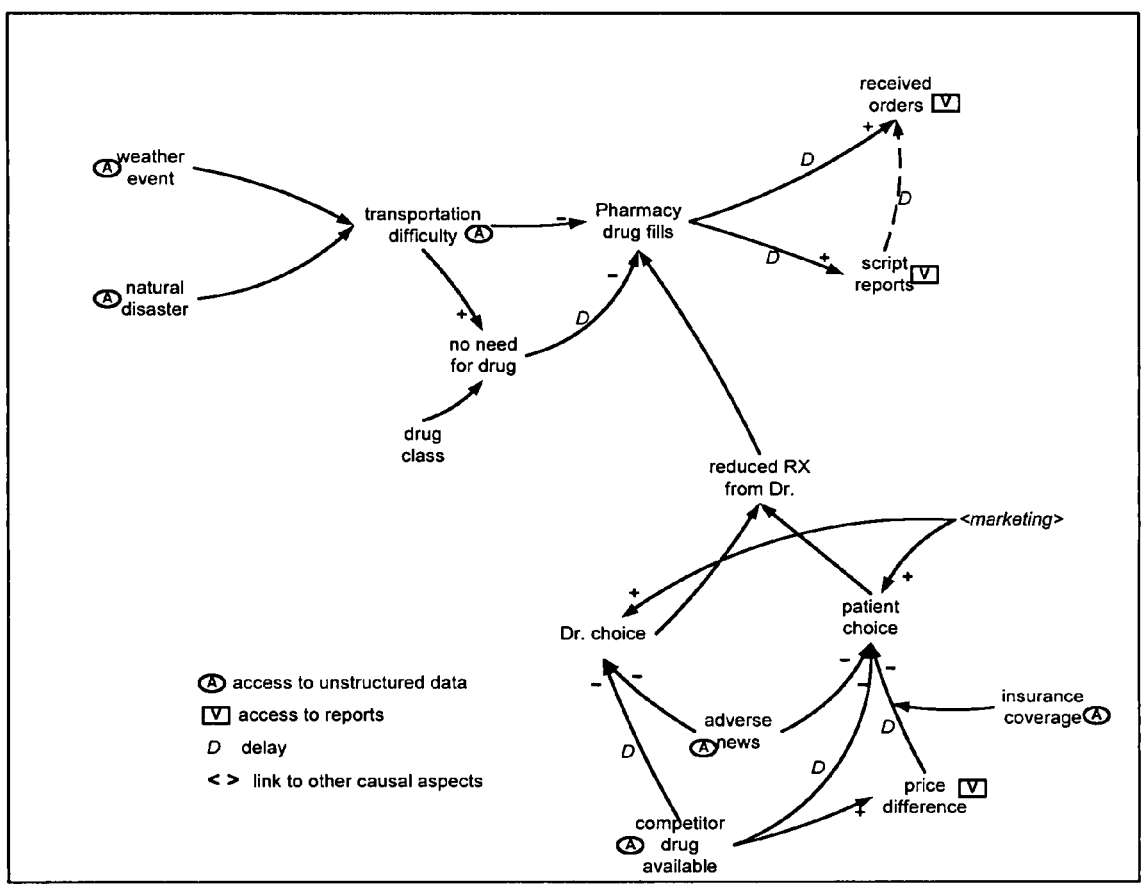
FIG. 1 is an example of a causal model display in a window with a legend for the displayed symbols.

The system representations for causal models, business process models and dimensional reports are designed to integrate so that the variables that are in the dimensional reports are attached to the processes and activities in the process model that they are measures of. The dimensional report variables are also linked to the relevant variables in the causal models so that navigation from one model to another model is possible. A given variable may be on many reports, on different business process model types and views, and on many different views and sub-models of the causal model.

The navigation can be performed in a number of ways including menu pop-ups and hyper-linking. One implementation is to have icons located next to the variables in the process model display or the causal model display that indicate an active link and the type of information it will link to.

For example, on the causal model, a variable may have an icon that indicates a dimensional report is available with that variable in the report. The report can then be retrieved by clicking on the icon. The navigation can move between different types of models, say the business process model to the causal model and between different views or parts of the same model type. The navigation between the models and reports is specific to the particular place being explored in the model. From the causal model, selecting the process model icon on a variable (if present) will show in another window the business process model with the particular activity that the variable is a measure of highlighted. The set of variables that that activity has as measures can be shown. When navigating from a report, the variable selected determines where in the causal model you are linked to. From each model or report, selecting a navigation to another model takes you to that model and highlights to a particular place on the model. When more than one instance of say a report is available on a navigation link, the choice of reports to show can be given to the user. It is possible to sub-set that report list by selecting additional variables in the causal or process models such that reports that help compare the various variables of interest.

Although business process models are integrated into the system and add considerable value in the navigation and use of the system, as shown in a later example use, they are not required. That is the system is also useful and novel in combining just the causl model and dimensional reports.

The users navigate among the models to determine the root causes of the observed behavior. When the causes are understood, some characteristics of the problem may be used to classify that problem solving session. The user may enter the characteristics of the behavior, this includes the observed variables time behavior, trends, the dimension levels and what dimension members are most affected, and then enter into the system why it is a problem. By recording this information and allowing later access by different users, that knowledge can be applied in future problem solving sessions. An example of presenting this information to a user is in FIG. 3. The system models this association of variables, variable characteristics and cause analysis for this type of presentation.

As the user navigates to other parts of the models and reports to figure out why something has occurred, the navigation path and action done by the user are recorded. In addition, the form of the dimensional reports is recorded. The report form carries information of what dimensions, levels and members were utilized in that report. The variables and dimension values may be different for the examined reports. This indicates a search for other supporting information such as price changes in other product families. The paths explored are the various variables and links in causal model and the process model. The user can enter the reasoning behind the various paths and report views for use by others. Some of the paths do not lead to the root cause but must be explored since they may have. The paths may be edited afterward during a replay to indicate the reasoning and usefulness of that path exploration. The path descriptions and path data are available to other users and searchable.

A report context is the set of dimension levels and dimension members involved in the report. In a dimensional report, the report can be 'drilled' down to select lower levels of a dimension hierarchy and then to select the individual members to examine. The set is the report context. The report context can be applied to other reports to make the report show the same dimension elements. The report context is recorded along with the other path information. The report context can also be modified directly. An example report context is shown in FIG. 15.

The users may add additional hypothesis and new factors and reports to the model. The causal and process models become a place for recording the existence and relevance of ad-hoc reports. An ad-hoc report is often made to distinguish multiple hypotheses or provide additional information to make the next step in the problem solving process. This information along with the causal model captures the problem solving ability of the organization that can be used for later learning and problem application and can prevent to recreation of a specialized ad-hoc report by reusing one that is now connected to the model.

After the root causes of a problem are determined, the business analyst must determine what to do. First he must determine what the possible actions are. Some variables are controllable by the business, called levers. For example, setting the price is a controllable variable for a business. These levers are indicated on the causal model and can be related to the processes that may be controlled. For a particular problem solving session, the user may decide to make changes to those levers. Often, other areas may then be affected that were not the intended effect and that can be determined by the causal model. Other variables that may change can be noted for an expected change and then monitored on the reports. Since delays are modeled in the causal model, the time range for an expected change can be also estimated. By noting on the reports or the causal model of the expected change, the cause of those changes may be known. So for example, if the next month has a report showing a problem in a different area variable and that variable could be affected by the prior change, that relationship can be shown on the first exploration of the models.

The actions taken are associated with the recording of the current problem solving session. The information in the problem solving sessions are searchable by all aspects of the data in them.

Figure 3:
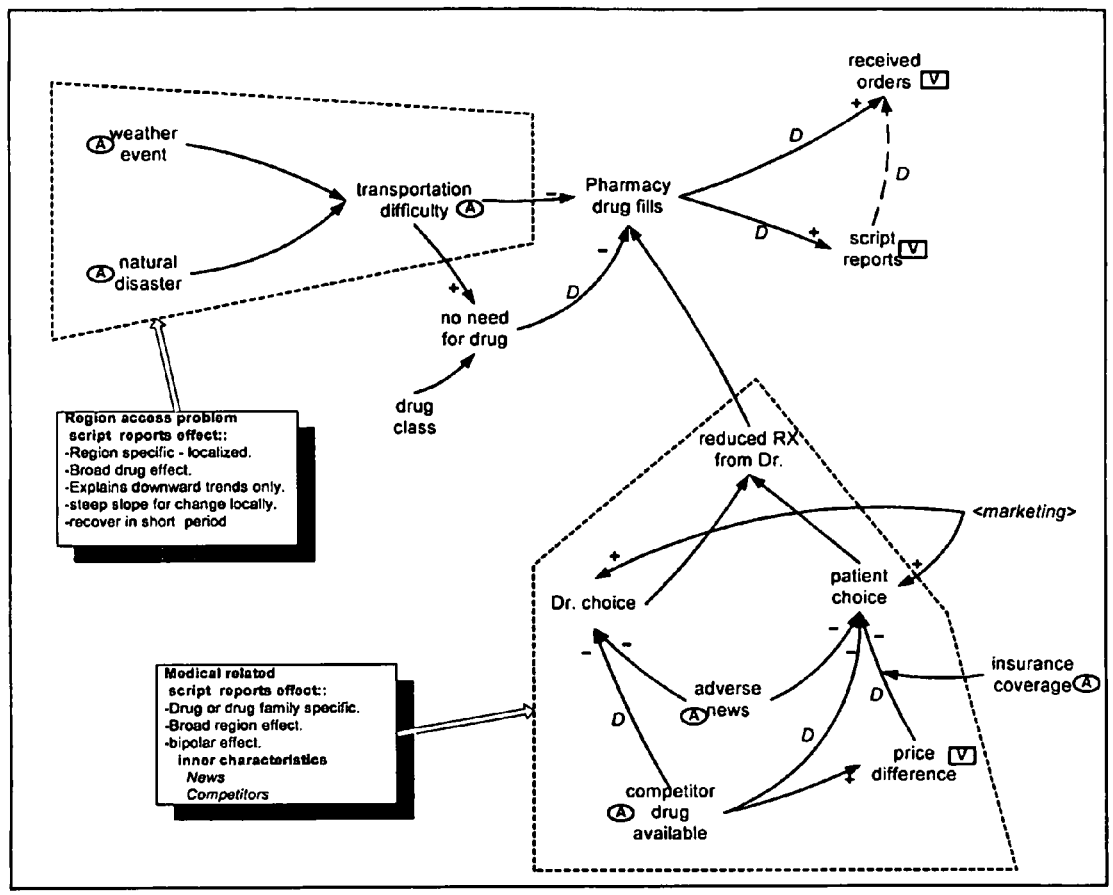
FIG. 3 is an example of a causal model display in a window with grouped causal chains.

Often a business process problem is indicated by a report variable or variables being outside of a particular tolerance. It is the cause of that behavior that is the problem to find. Major classes of those problems may be identified and associated with a set of causal elements. An example is shown in FIG. 3. The user can have the set of classes shown on the model. A particular problem class may have descriptions of the characteristics of various variables attached to it. By using this information, the user can more easily decide what to explore next or to decide on the actual root cause of the problem. The characteristics are given for the problem classes and the involved elements are shown on the display. The sets may overlap or be subsets or supersets. The sets may also be shown one at a time to avoid confusion.

The characteristics have several views. The most specific view which corresponds to direct values in the observed behavior to more general views of the characteristics. For example, an observed behavior could be generalized to saying it is region specific and product broad or covering a wide range of products. The exact region or products may be unimportant. For entry of the characteristics, this generalization would occur after the root cause has been determined and that it would be useful in a wider context. For initial problem solving, the user would see which characteristics fit this current problem.

By relating the characteristics of the observed behavior with the recorded path explorations, the user can be offered advice on what to examine next based on past experience. The characteristics of prior sessions most closely matching the current problem session characteristics are used to select the first set of possible history to follow. All path exploration history is available in various formats for understanding their meaning for the current session. An example of path exploration history is in FIG. 4.

A successful path exploration is the path through the models that leads to the root cause determination for a particular business problem. The full path exploration includes all side path explorations that were needed to eliminate other possible causes. Successful and full path exploration histograms for both overall and identified characteristics can be seen by the user. They can be subsetted by a particular variable in the model. That is, only prior path explorations that traversed a given variable in the causal model can be selected to be shown. The histogram information can be shown in various ways, including numbers on the causal link, numbers on the variables, width or color of the link or variable. For example, a successful path in past explorations may pass through a particular causal model variable 10 times. The number 10 could be shown, or a color could be used to indicate a range that included 10. The user can use this histogram information to determine which paths to explore first. For example, if a path has been found to be on the causal path for 90% of prior sessions, it probably should be explored first. The most likely path can be shown to the user by the system.

If the characteristics are given a formal specification language, the match to specifications could be done via a rules engine using fuzzy logic. This would automate more of the upfront process but would be very difficult to do well.

The causal and process models may be different for some different members of a dimension hierarchy. For example, in sales, from stock sales is very different than made to order sales. The particular causal models for the different areas are related and linked for navigation to each other. The variables that caused the different models are noted and the member ranges for each are shown in the variable instance in the causal model.

Many variables and factors in the causal model may not have direct information concerning their values in the form of dimensional reports, but unstructured information may be. For example, a variable may be natural disasters, and instead of having a structured table for that, it may require a document search and the parameters of the search can have a lot of restrictions already from the variable in the model. For this example, the search would be for news of natural disasters in a given time frame and perhaps a given area. The connection to that unstructured information and how to subset it is information stored in the model for that variable. The user can select the form of the data access.

Example Uses

The details of the invention can be made clearer by showing several scenarios.

Scenario A:

A user at a pharmaceutical company is responsible for a division's drug family. Looking at the orders reports, he sees that orders for a particular drug are down over most of the country. He wants to know why.

Figure 2:
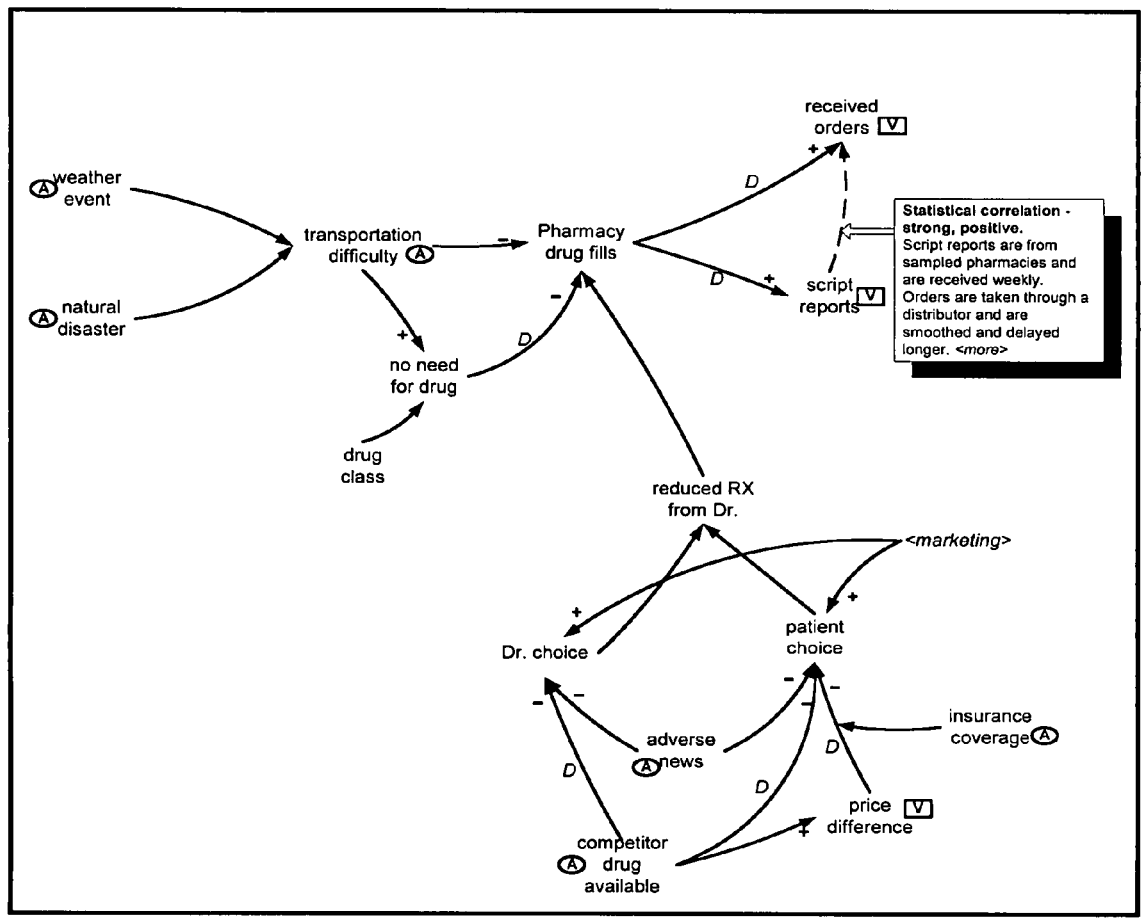
FIG. 2 is an example of a causal model display in a window with an information pane.

In the report, on the orders variable he is interested in, he selects 'causal analysis' from a menu, which opens a window such as shown in FIG. 1. He sees that 'Script reports' is a linked variable as in FIG. 2, where he sees that the 'script reports' are statistically correlated with the orders and that they are from a sampled set of pharmacies around the country that report on all drugs dispensed for the week. It carries different and important information than the orders report.

Many variables in the diagrams are hidden variables, that is their values are not knowable directly. 'pharmacy drugfills' is a hidden variable since it is only knowable indirectly by its effect on sampled script reports.

He looks at several reports about the scripts accessible from the causal diagram.

He wants to know what others have done before him when looking at similar data.

He selects 'show problem groups' and sees FIG. 3 in a window that shows groupings on the causal diagram for previously discovered problems and also sees FIG. 4 in another window that shows a list of prior problem solving sessions that can be searched and ordered.

FIG. 3 also shows the grouping of problems with their general characteristics. In reading the characteristics, he notices that what he is seeing corresponds to the characteristics of the 'medical related' group. He sees that the main determiners are news, competition and insurance coverage changes. Each has access to unstructured information that is set up to find relevant information for that topic. For example the news link would be to only news about drugs where he will narrow down to the drug of interest in a reasonable time frame.

Figure 5:
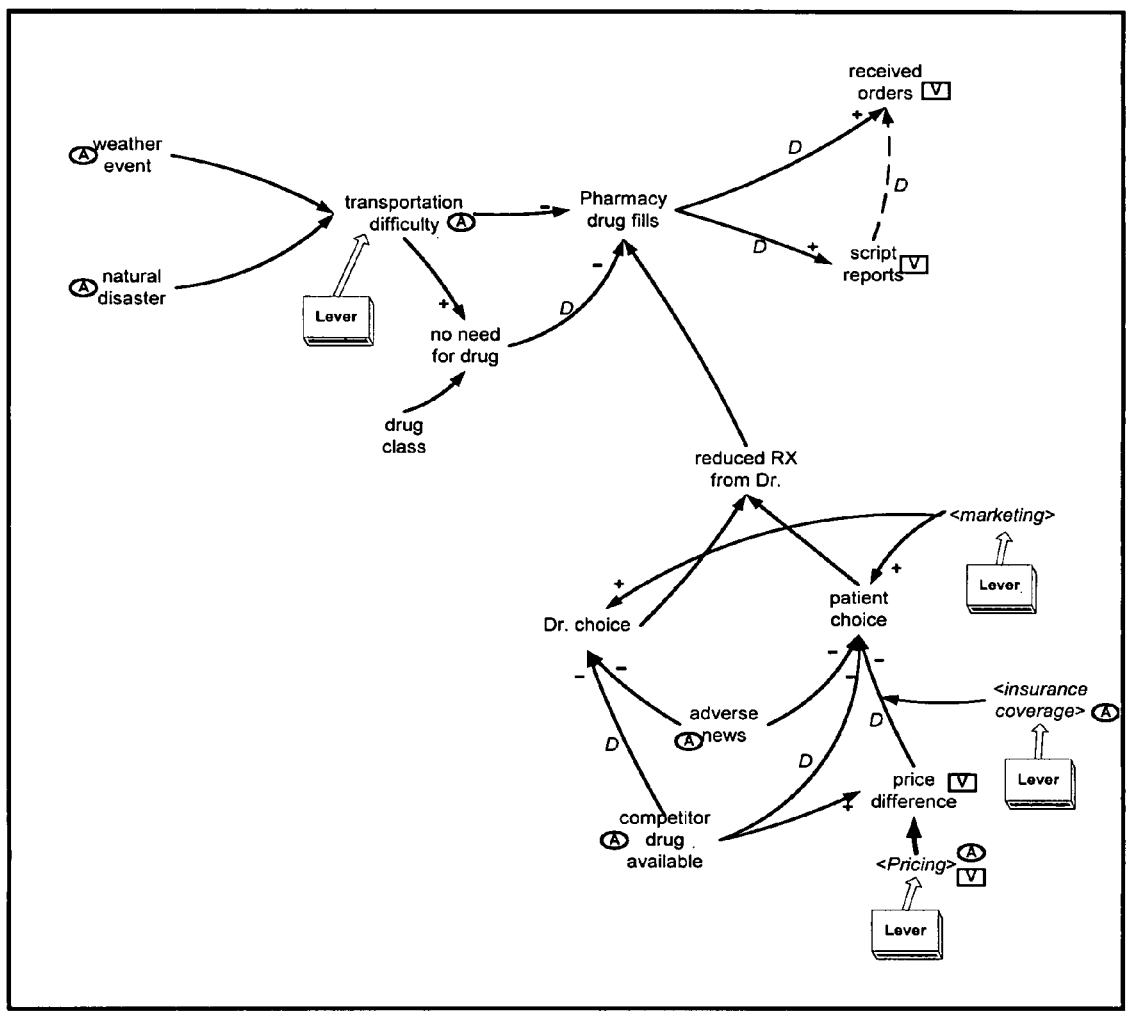
FIGS. 5, 6, 8, 9, and 10 are examples of a causal model display in a window to support an example problem solving session.

After looking at the available information, he realizes that a much cheaper alternative drug has, been released by a competitor. He is not sure of what things he can control, so he selects 'show levers' and sees FIG. 5 which shows 3 possible levers in the problem area. Now his real work begins to determine the relative strengths of the forces involved and come up with a solution. During this entire process, his exploration is being recorded and he can add notes to the record so that later on, he or someone else, even in another division can utilize the knowledge gained in this problem solving session.

Scenario B:

This starts as in scenario A, but after selecting 'causal analysis' to get to FIG. 1, he selects 'get-advice'. Get-advice looks at prior exploration paths and problem characteristics to offer advice. It suggests looking at 'script reports' and shows the list of possible characteristics to look for to characterize the problem. The reports may be ordered in importance for determining the problem characteristics. He is asked which characteristic sets seem to fit the data. FIG. 4 is shown with the relevant problem groups visible. If inner characteristics are available, they are then stepped through. Since the variable of interest trend is downward, both the 'news' and the 'competitor' inner characteristics are possibilities. He then finishes as in scenario A.

Scenario C—A Manufacturing Example Shows Interactions with Business Process Models.

Figure 6:
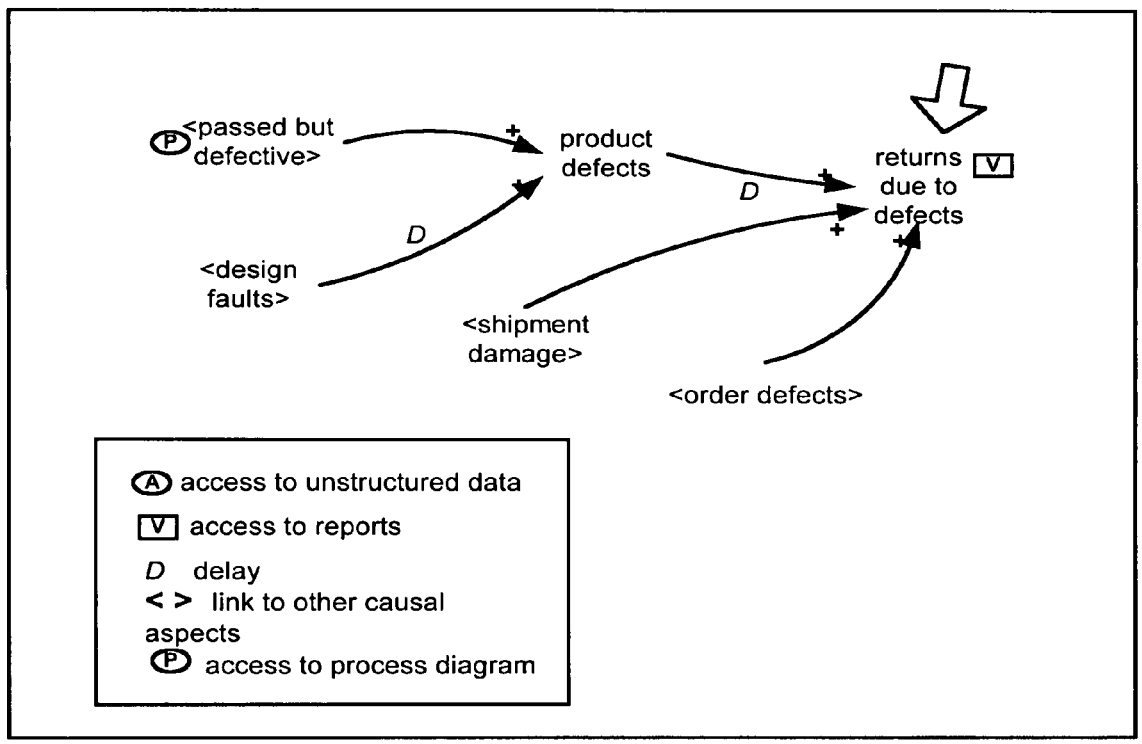
Figure 7:
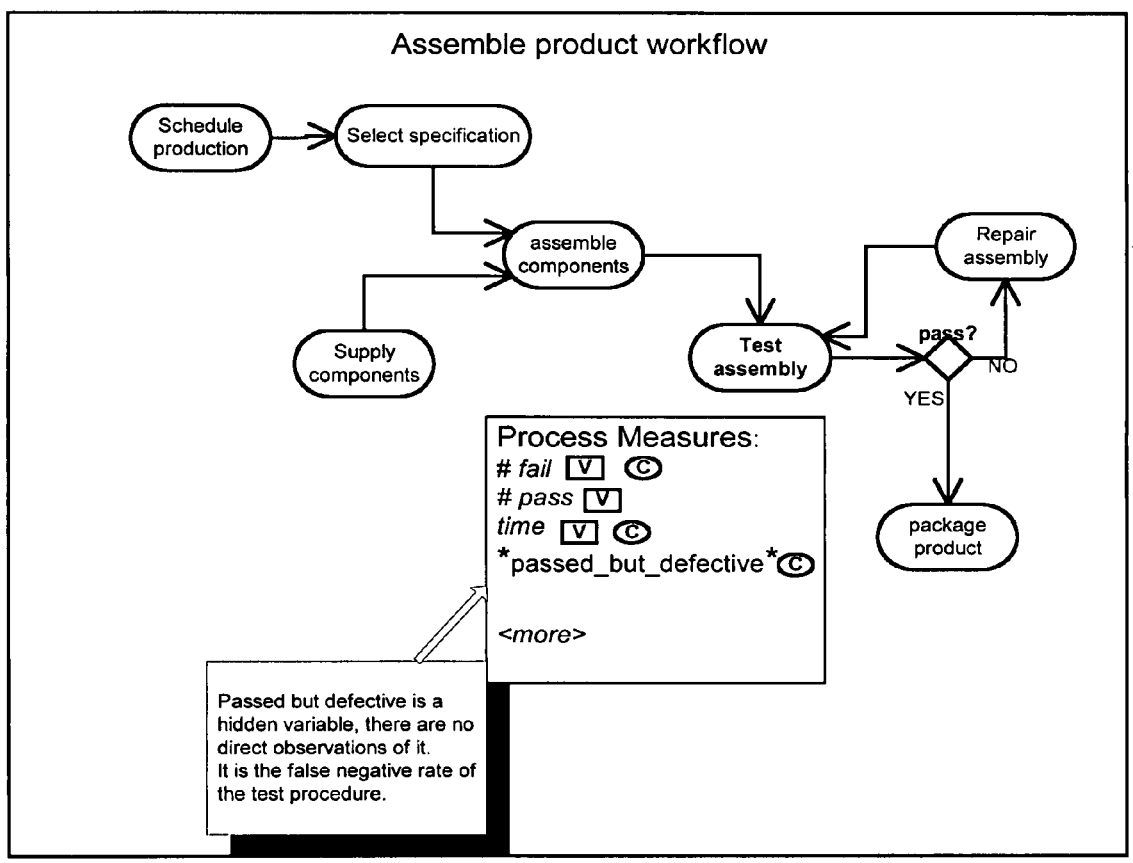
FIG. 7 is an example of the display of a business process model.

The user has a report indicating that returns due to defects in manufacturing is higher than expected and has been trending upwards. By selecting 'causal analysis' on the measure, he sees FIG. 6 with the variable highlighted. He decides that they are likely due to product defects and will explore that first. The variable 'passed but defective' continues to other causal diagrams, but also has a 'process' symbol, that when selected brings up the window in FIG. 7 which shows the assemble product workflow. The highlighted activities carries the metric 'passed but defective' as a hidden variable, that is it is not directly observable, but it is associated with this activity. The variable is the false negative rate of the test. Other metrics at the same level are also shown and other data on the activities are accessible.

Figure 8:
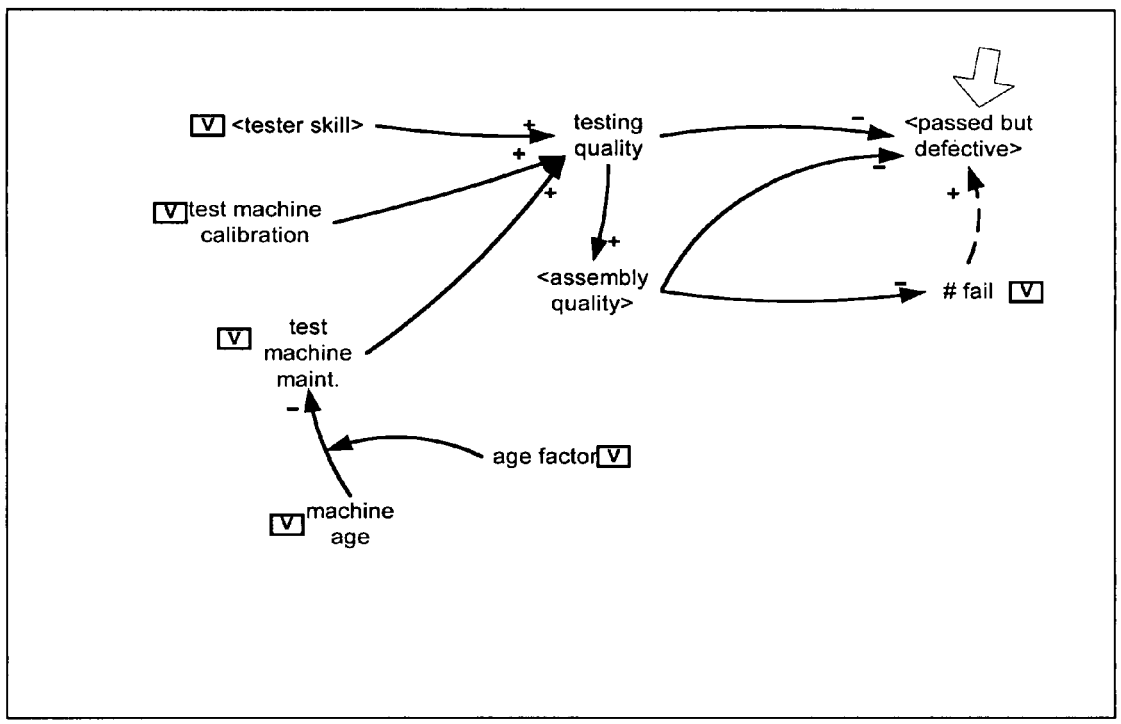
Figure 9:
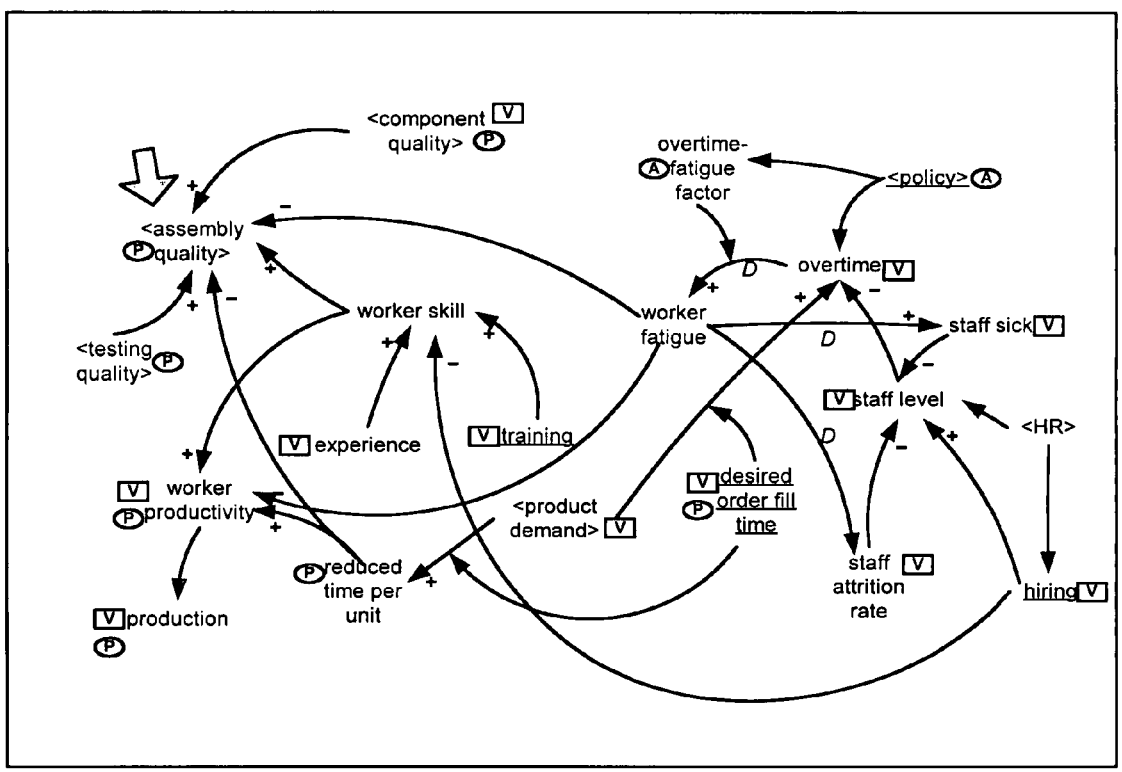
Figure 10:
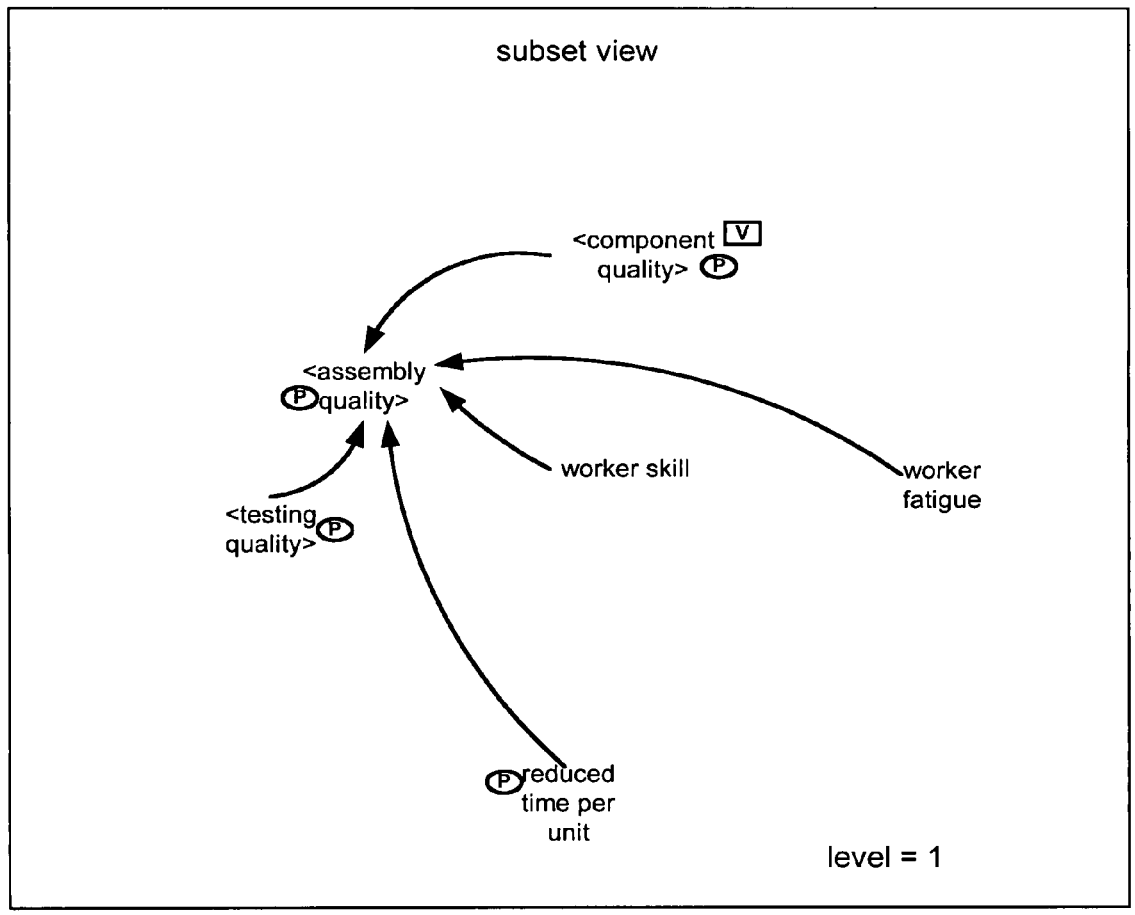

Movement along the process model is possible by selecting another activity and selecting a metric for examining the data or other causal models. Continuing with the current example, the user selects the causal view of 'passed but defective' and sees FIG. 8. He sees that it is statistically correlated with the number of failed units and is controlled by testing quality and assembly quality. He wants to examine the assembly quality and selecting it shows FIG. 9 with the assembly quality variable highlighted. It shows the quality is also affected by component quality, worker skill, worker fatigue and time allowed per unit. By examining all the factors and the leads to the available data, he decides that high demand and understaffing lead to worker fatigue which has caused the problem. The levers available to him are indicated here by underlined variables. His real work now starts as he has to balance all the factors and controls for his company.

Preferred Implementation

Standards exist for the representation of process models. The OMG 2.0 UML activity diagrams are extended for business process models. Dimensional structures and reports are modeled in the Common Warehouse Metamodel standard from the OMG. The OMG standards will be used here in the preferred implementation. There are no standards for Causal models, but they can be based on the OMG UML static structure metamodel.

Figure 11:
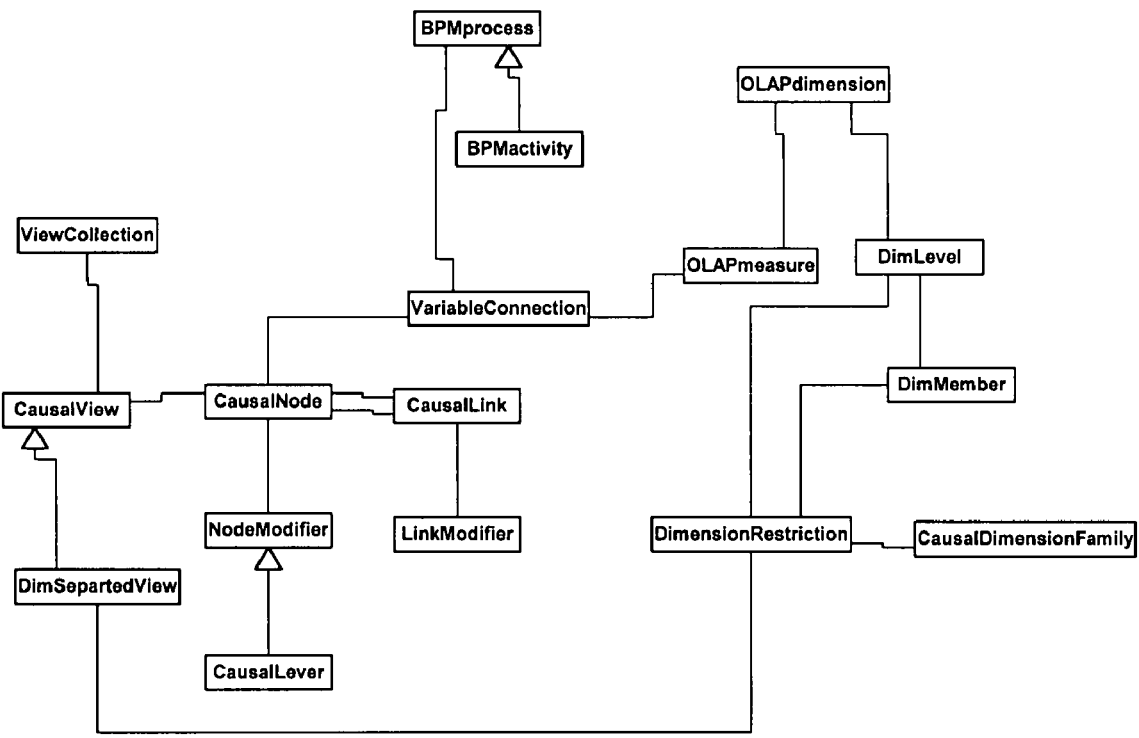
FIGS. 11 and 12 are reduced UML static structure diagrams depicting a basic domain model for a system to implement this invention.
Figure 12:
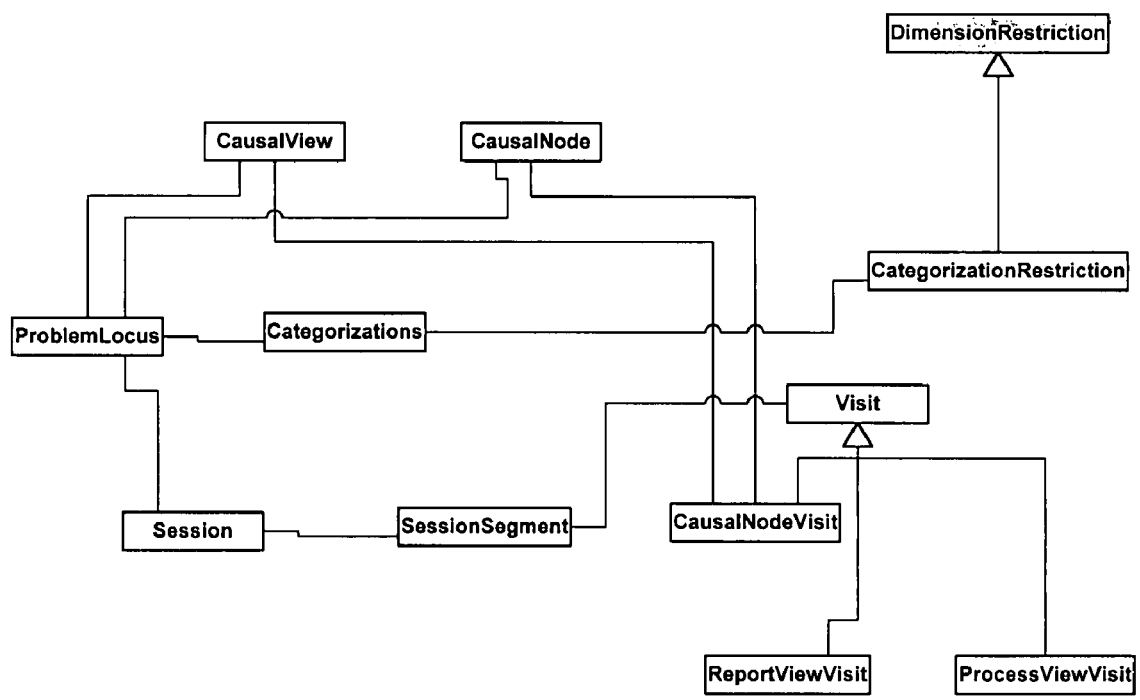
Figure 14:
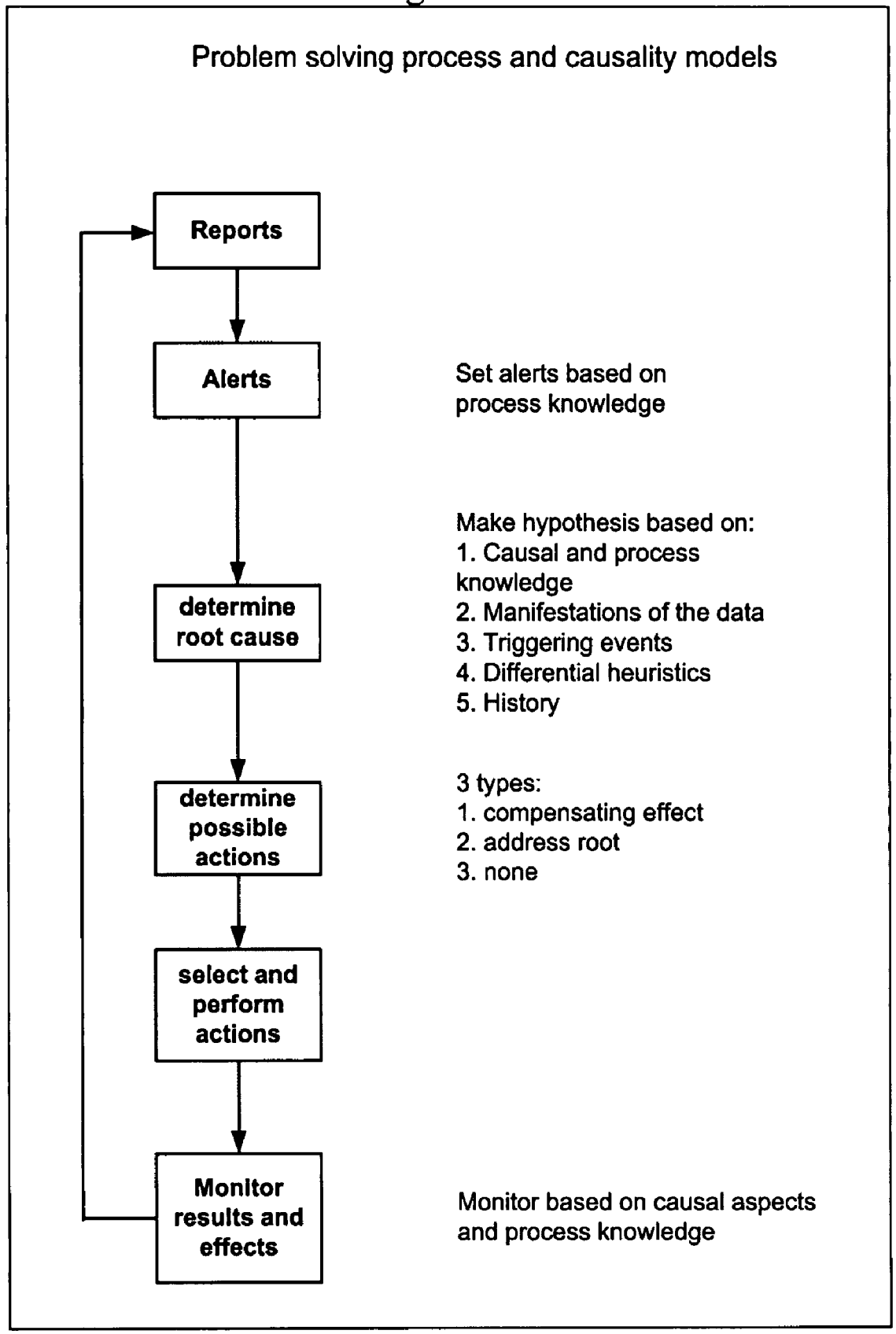
FIG. 14 is the process depiction of problem solving.
Figure 16:
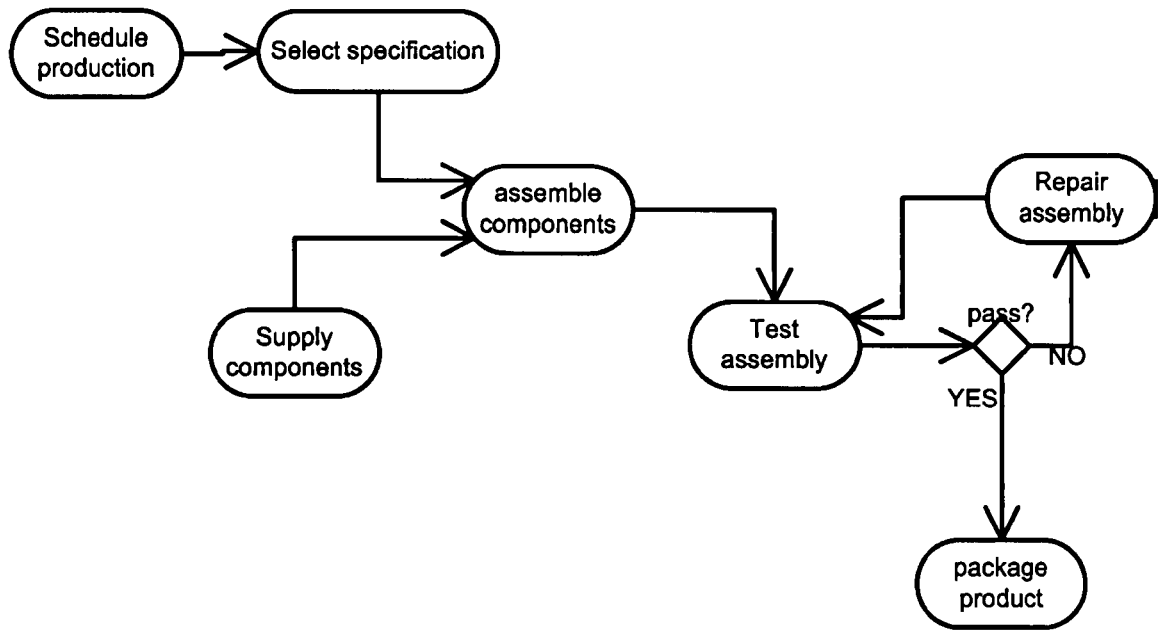
FIG. 16 is an example of a business process model diagram.

The basic design of the domain model for a system implementation of these methods is given in FIGS. 11 and 12. These are based on the model standards given above.

The particulars of how information is displayed and how the user interacts can be through many different methods. For example, icons can indicate access links to the other relevant models for a given model, or pop-up menus can be used. A person skilled in the art of software can create many reasonable interfaces for this system. A person skilled in the art of software can construct a system based on the prior description and the domain design.

What is claimed is:

1. A computer-implemented method comprising:
via a visual display of a first model from a plurality of models comprising a causal model, an activity model, and a dimensional report model, rendering a plurality of variables, each of said plurality of variables linked together by model element links between each said plurality of models, each model element link rendered as a link symbol, said plurality of variables comprising at least one of a process metric and a control variable, wherein:
user selection of a link symbol of a first link associated with a first variable of said plurality of variables and rendered via said first model is adapted to cause said first variable to be rendered via a second model from said plurality of models, said first link uniquely indicative of the particular model from said plurality of models to which said first link is directed;
if said second model is adapted to render a plurality of instances of said first variable, selection of said link symbol of said first link is adapted to cause a user-selectable list of said plurality of instances to be rendered; and
user selection of said link symbol of said first link is adapted to cause each instance of said first variable to be highlighted in a rendering of said second model.

2. The method of claim 1, wherein:
if said second model is said activity model, and said first variable is a metric of an activity in said activity model, user selection of said link symbol of said first link is adapted to cause each instance of an activity model element associated with said activity metric to be highlighted.

3. The method of claim 1, further comprising:
receiving a user-supplied selection of a sub-plurality of variables from said plurality of variables.

4. The method of claim 1, further comprising:
rendering a list of reports, each of said reports comprising values for each of a user-selected sub-plurality of variables from said plurality of variables.

5. The method of claim 1, further comprising:
rendering a list of reports, each of said reports comprising values for each of a user-selected sub-plurality of variables from said plurality of variables, each of said reports linked to or from a corresponding dimensional report model.

6. The method of claim 1, further comprising:
receiving a user-supplied selection of a sub-plurality of variables from said plurality of variables and rendering a list of reports, each of said reports comprising values for each of said sub-plurality of variables.

7. The method of claim 1, further comprising:
recording each selection of each link symbol associated with one of said model element links.

8. The method of claim 1, further comprising:
recording a user-navigated intra-model link.

9. The method of claim 1, further comprising:
recording a navigation path, said navigation path comprising a plurality of user-selected links.

10. The method of claim 1, further comprising:
recording a user-provided reason associated with a user-selected link.

11. The method of claim 1, further comprising:
recording a user-provided reason associated with a user-selected navigation path.

12. The method of claim 1, further comprising:
recording a user-provided assessment associated with a user-selected link.

13. The method of claim 1, further comprising:
recording a user-provided assessment associated with a user-selected navigation path.

14. The method of claim 1, further comprising:
for each rendering of a dimensional report associated with said dimensional report model, recording a form of said dimensional report.

15. The method of claim 1, further comprising:
for each rendering of a dimensional report associated with said dimensional report model, recording information relating to dimensions utilized by said dimensional report.

16. The method of claim 1, further comprising:
for each rendering of a dimensional report associated with said dimensional report model, recording information relating to dimension members utilized by said dimensional report.

17. The method of claim 1, further comprising:
for each rendering of a dimensional report associated with said dimensional report model, recording information relating to levels utilized by said dimensional report.

18. The method of claim 1, further comprising:
for each rendering of a dimensional report associated with said dimensional report model, recording information relating to a context of said dimensional report.

19. The method of claim 1, further comprising:
recording information regarding said rendering.

20. The method of claim 1, further comprising:
receiving a user-supplied selection of a subset of recorded link selections from a plurality of recorded link selections.

21. The method of claim 1, further comprising:
receiving a user-supplied indication of a relevance of a recorded link selection from a plurality of recorded link selections.
22. The method of claim 1, further comprising:
receiving a user-supplied selection of a recorded navigation path from a plurality of recorded navigation path.
23. The method of claim 1, further comprising:
replaying a recorded navigation path.
24. The method of claim 1, further comprising:
receiving an edit to a recorded and user-selected navigation path.
25. A computer implemented method comprising:
recording a user navigation of a plurality of user-selected instances of link symbols, each of said user-selected instances representing a model element link to a corresponding model from a plurality of models, said plurality of models comprising a causal model, an activity model, and a dimensional report model, each of said user-selected instances associated with a corresponding variable occurring in said corresponding model, each of said user-selected instances uniquely indicative of said corresponding model, selection of each of said user-selected instances adapted to cause a display to highlight each instance of said corresponding variable in said corresponding model.
26. A computer implemented method comprising:
via a recording of a plurality of user navigation paths, each user navigation path from said plurality of user navigation paths comprising a plurality of user-selected instances of links, each of said links representing a connection to a corresponding model from a plurality of models, said plurality of models comprising a causal model, an activity model, and a dimensional report model, each of said links associated with a corresponding variable occurring in said corresponding model, rendering a user selectable list comprising a subset of said plurality of user navigation paths.

* * * * *